United States Patent

Paup et al.

[11] 4,027,142
[45] May 31, 1977

[54] AUTOMATED PROCESSING OF FINANCIAL DOCUMENTS

[75] Inventors: Robert E. Paup; James F. Blair, both of Dallas, Tex.

[73] Assignee: Recognition Equipment Incorporated, Dallas, Tex.

[22] Filed: Aug. 18, 1975

[21] Appl. No.: 605,605

Related U.S. Application Data

[63] Continuation of Ser. No. 448,458, March 6, 1974, abandoned.

[52] U.S. Cl. .............................. 235/61.9 R; 101/72; 235/61.11 E; 346/75
[51] Int. Cl.² ..................... G06K 3/02; G06K 7/14; B41L 45/00; G01D 15/18
[58] Field of Search .......... 101/93.04, 72; 197/1 R; 235/61.9 R, 61.7 B, 61.11 E, 61.11 R, 61.11 A, 61.11 D, 61.12 N; 209/74; 346/75, 1; 250/569; 340/146.3 E; 164/115

[56] References Cited

UNITED STATES PATENTS

| 2,124,906 | 7/1938 | Bryce .......................... 235/61.11 E |
| 2,275,396 | 3/1942 | Johnson ............................. 164/115 |
| 3,120,800 | 2/1964 | Ward ................................... 101/72 |
| 3,470,357 | 9/1969 | Ritzerfeld .................... 235/61.11 D |
| 3,588,457 | 6/1971 | Bijleveld ..................... 235/61.12 N |
| 3,650,205 | 3/1972 | Wybrow ............................. 101/72 |
| 3,698,002 | 10/1972 | Appel .................................. 346/1 |
| 3,703,628 | 11/1972 | Phillipson .................... 235/61.9 R |
| 3,913,719 | 10/1975 | Frey .................................. 197/1 R |

*Primary Examiner*—Robert M. Kilgore
*Attorney, Agent, or Firm*—John E. Vandigriff

[57] ABSTRACT

Automated processing of bank checks encoded with alphanumeric characters on the face of each check by transporting said checks as a serial constant velocity train through a processor to a sorter while at a first station generating an item control number unique to each document and at a second station sensing each character in the encoded line to produce a string of data signals for each document. At a third station the control number and other data is imprinted on the back of each document in code form and the control number and other data is imprinted on the face of each document in human readable form.

20 Claims, 8 Drawing Figures

AUTOMATED PROCESSING OF FINANCIAL DOCUMENTS

This is a continuation of application Ser. No. 448,458, filed Mar. 6, 1974, now abandoned.

This invention relates to control and encoding of documents evidencing financial transactions, and more particularly to the automatic reading and specially encoding of financial transaction documents, such as bank checks, deposit slips, etc.

Banking institutions have employed check processing systems based on magnetic ink character recognition devices for well over a decade. The cost for processing bank checks in the United States currently approaches a billion dollars per year. The avoidance of manually handling checks may dramatically reduce the labor cost. Virtually every check and deposit slip processed through a banking system now requires manual encoding of the amount in magnetic ink. An average of three-fourths of such checks bear machine-imprinted amounts, many of which can be read automatically by optical character recognition equipment now available.

The present invention involves a system which provides a solution to item-processing applications in the domestic financial community as well as in commercial operations outside the United States. The invention is particularly directed to the capture of information on documents in a process stream and a method whereby documents can be moved in commercial channels in either direction and can be traced by positive item control indicia placed on each document. Positive item control avoids problems associated with lost checks or other financial items. Past processing inquiries are substantially diminished because the entire document flow can be precisely reconstructed. Dates, endorsements, cancellations, transit and routing numbers, account numbers, deposits and amounts and other information is also selectively provided on items under a program control. Thus, the present invention provides document data capture for a family of systems that can read, sort, endorse and microfilm checks or perform other operations in a single pass through the transport at a rate of the order of twenty-four hundred items per minute or more. Positive item control is achieved through the printing of a unique identification number on each item, preferably both in human readable form on the front of the document and in bar code form such that the unique number is carried through all accounting operations involving the document, allowing a precise reconstruction of the document flow in the event of lost documents or subsequent inquiries.

The present invention is an improvement over U.S. Pat. No. 3,703,628 granted Nov. 21, 1972.

In accordance with one aspect of the invention, bank checks encoded with magnetic alphanumeric characters along a line on the face of each check are automatically processed by transporting the checks as a serial constant velocity train through a processor to a sorter while at a first station generating an item control number unique to each document and at a second station sensing each character in the encoded line to produce a string of data signals for each document. At a third station the control number and other data are imprinted on the back of each document in bar code form and at least the control number is imprinted on the face of each document in human readable form.

In accordance with a further aspect of the invention, an improvement is provided in a document sorter-processor where a high speed transport moves a train of documents through an alpha-numeric character reader means and a first ink jet printer to an address in a family of destinations read from each document by the reader means and wherein means connected between the reader means and the printer actuate the printer to imprint on the back of each document a bar code representation of signals from the reader means. The improvement involves providing a bar code reader through which the document train passes for sensing and comparing the bar code applied to each document by the printer from signals applied to the printer. Control means is provided to produce an ordered set of indicia changing with the presence of each new document in the processor. A second ink jet printer is provided through which each document passes. Means are then provided for delayed actuation of the first and second printers in response to the control means to apply one of said indicia as a positive item control number to each document both in code form on the back and alphanumeric form on the face thereof.

For a more complete understanding of the present invention and for further objects and advantages thereof, reference may now be had to the following description taken in conjunction with the accompanying drawings in which.

Figure 1:
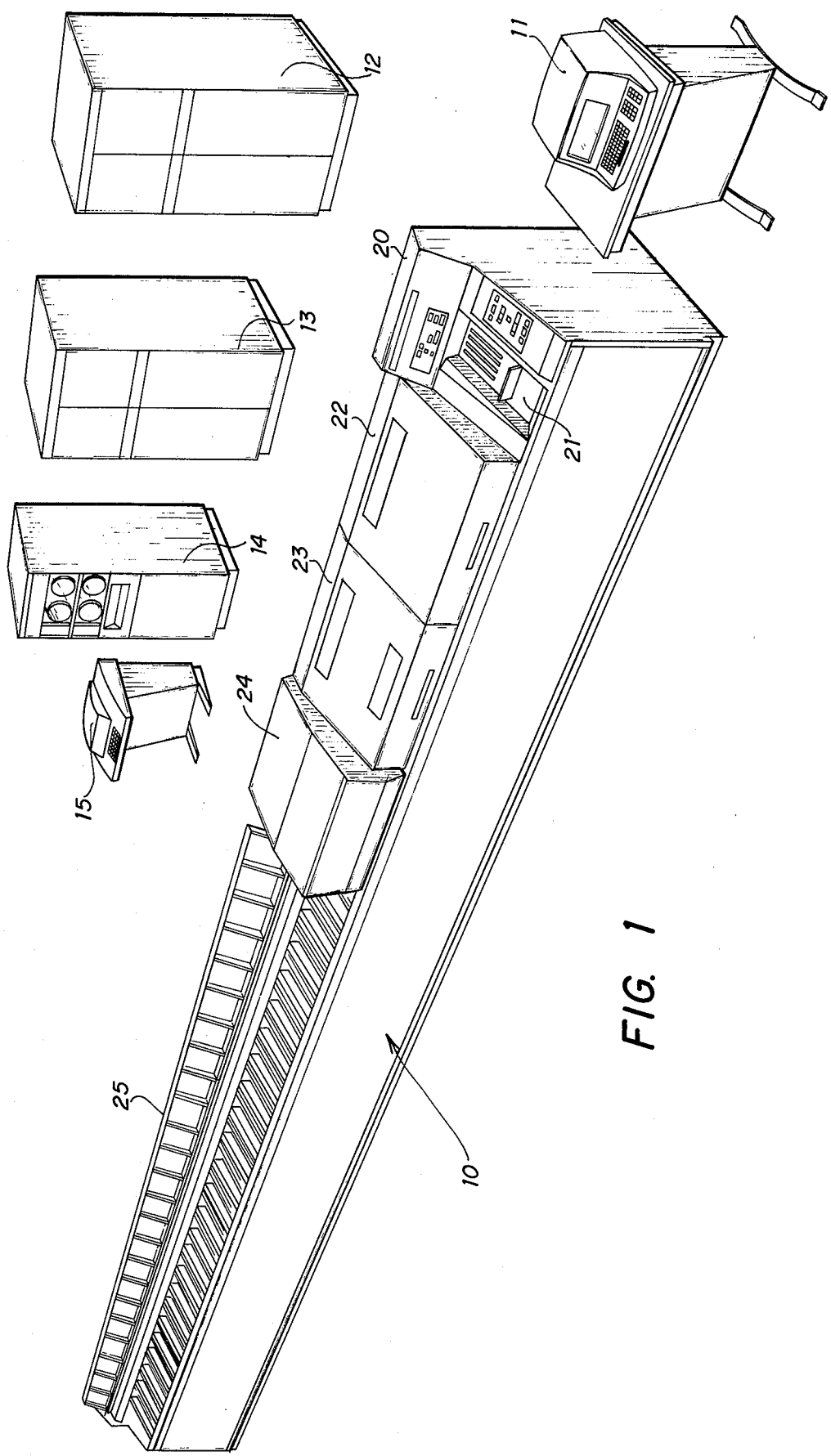
FIG. 1 is a perspective view of a complete system embodying the present invention.

Referring now to FIG. 1, a capture system is illustrated wherein a main transport unit 10 has associated therewith an operator CRT/keyboard unit 11, a recognition unit 12, a control unit 13, a computer sub/system unit 14 and a teletype 15.

The system illustrated in FIG. 1 is particularly suitable to deal effectively with the paper processing problems of large banks. As illustrated, the system is in modular form designed for high speed reading, sorting and microfilming of banking paper, such as checks. The present invention is directed to the implementation of positive item control wherein each check is identified with a unique number as it passes through the system and is encoded in a form as to be utilized in automatic processing after capture. Thus, the transport 10 comprises a document feeder 20 having a tray 21 into which a stack of checks is placed. The checks are then moved serially as an uninterrupted train through a read module 22, a bar-code/IJP module 23, a feature module 24 and thence to a family 25 of sorting bins. The checks are sorted based on codes borne by each check to provide for distribution and to facilitate accounting procedures.

The present invention is concerned with the operations carried out in connection with modules 22-24. The capabilities provided is to imprint a positive item control number on each individual document and to further encode each document to accommodate automatic interchange, both in a forward and return direction, for documents between banks in a manner compatible with various automatic processing systems. A trail is provided for tracking the document as interchanges occur. This is accomplished by means of imprinting multiple positive item control numbers as bar code formats, endorsements and the like on each document in a systematic controlled manner.

Further, means are provided for printing bar codes by way of ink jet printing systems over endorsements and other materials appearing on the document and means for subsequently reading those bar codes with high accuracy. The positive item control number is a system generated number with a sufficient number of digits to permit tracking of the document back to an image at a given address on a given roll of microfilm. Such tracking is valuable for processing jams, lost or misplaced documents, etc. The positive item control number may be of magnitude up to fourteen decimal digits or more in order to provide the necessary range.

The positive item control number is imprinted by an ink jet printer both in human readable form (alphanumeric) and machine readable form (bar code). Thus, the positive item control number is recorded with the bank check image on microfilm and also with the digital transaction record which may be entered into a computer for carrying out the accounting functions. The capture of data appearing on financial documents and the establishment of a relationship between the captured data and the document itself and as well as its image as captured on microfilm are achieved.

FIG. 2

Figure 2:
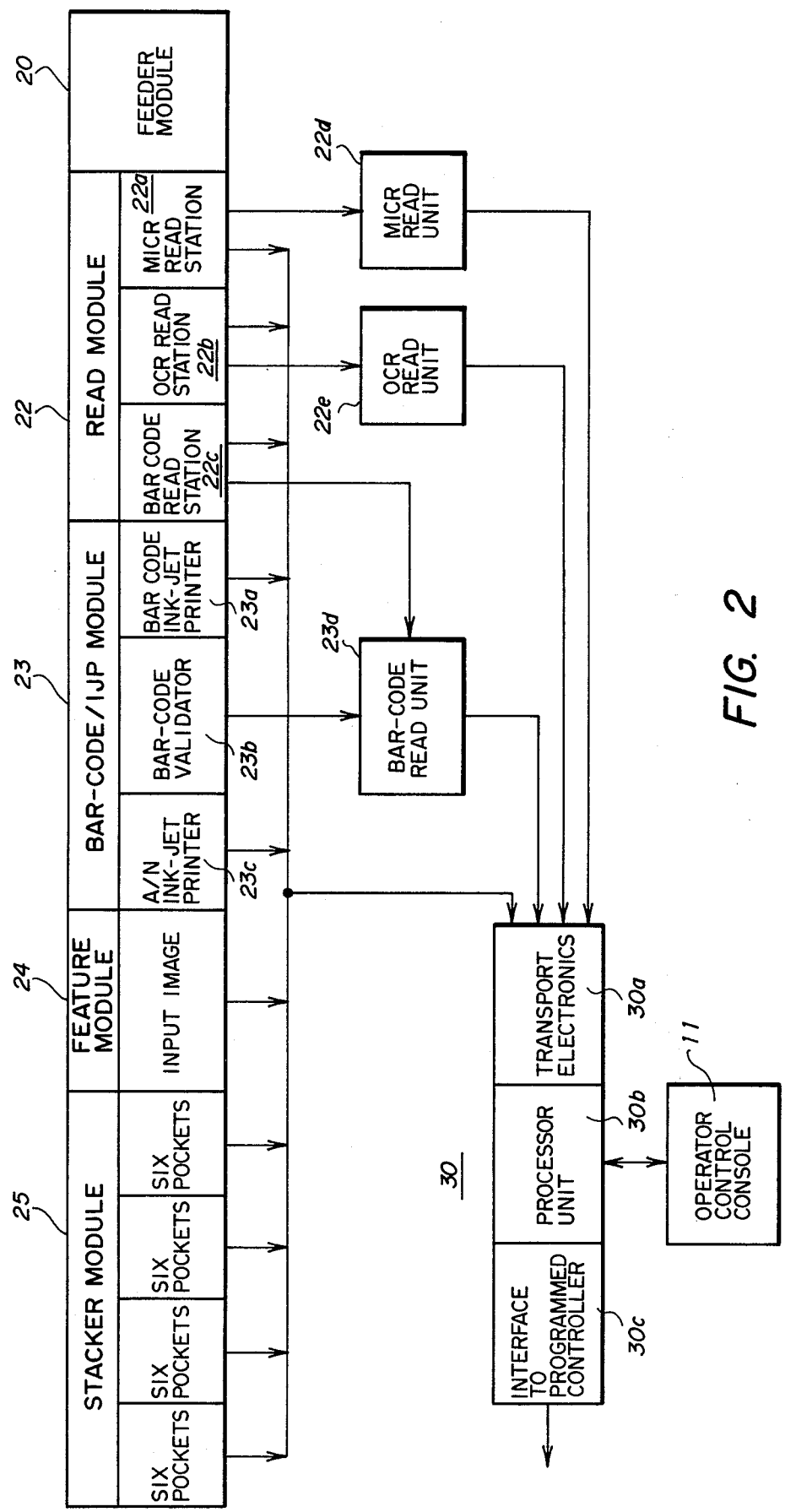
FIG. 2 is a block diagram illustrating the capture system embodying the present invention.

FIG. 2 provides an overall view of the functional aspects of the capture system. The feeder module 20 is shown in logical relationship to read module 22. Read module 22 includes an MICR read station 22a, an OCR read station 22b and a bar-code read station 22c. The read unit 22a is connected by way of a read unit 22d to a computer 30 which involves a transport electronic section 30a, a processor unit 30b and an interface unit 30c leading to a programmed controller. The OCR read station is connected from an OCR read unit 22e to the section 30a in computer 30.

Bar code/IJP module 23 includes a bar code ink jet printer 23a, a bar code validater 23b and a dual alphanumeric ink jet printer unit 23c. The validater unit 23b is connected by way of a bar code read unit 23d to the transport electronics 30a.

The feature module 24 includes a microfilm camera which photographs both the front and back of each document passing through the system and records the same on microfilm.

Documents passing from module 24 are delivered to stacker module 25 which in the embodiment described herein is provided with four sets of six sorting pockets into which the documents may be divided based upon codes on the documents.

FIG. 3

Figure 3:
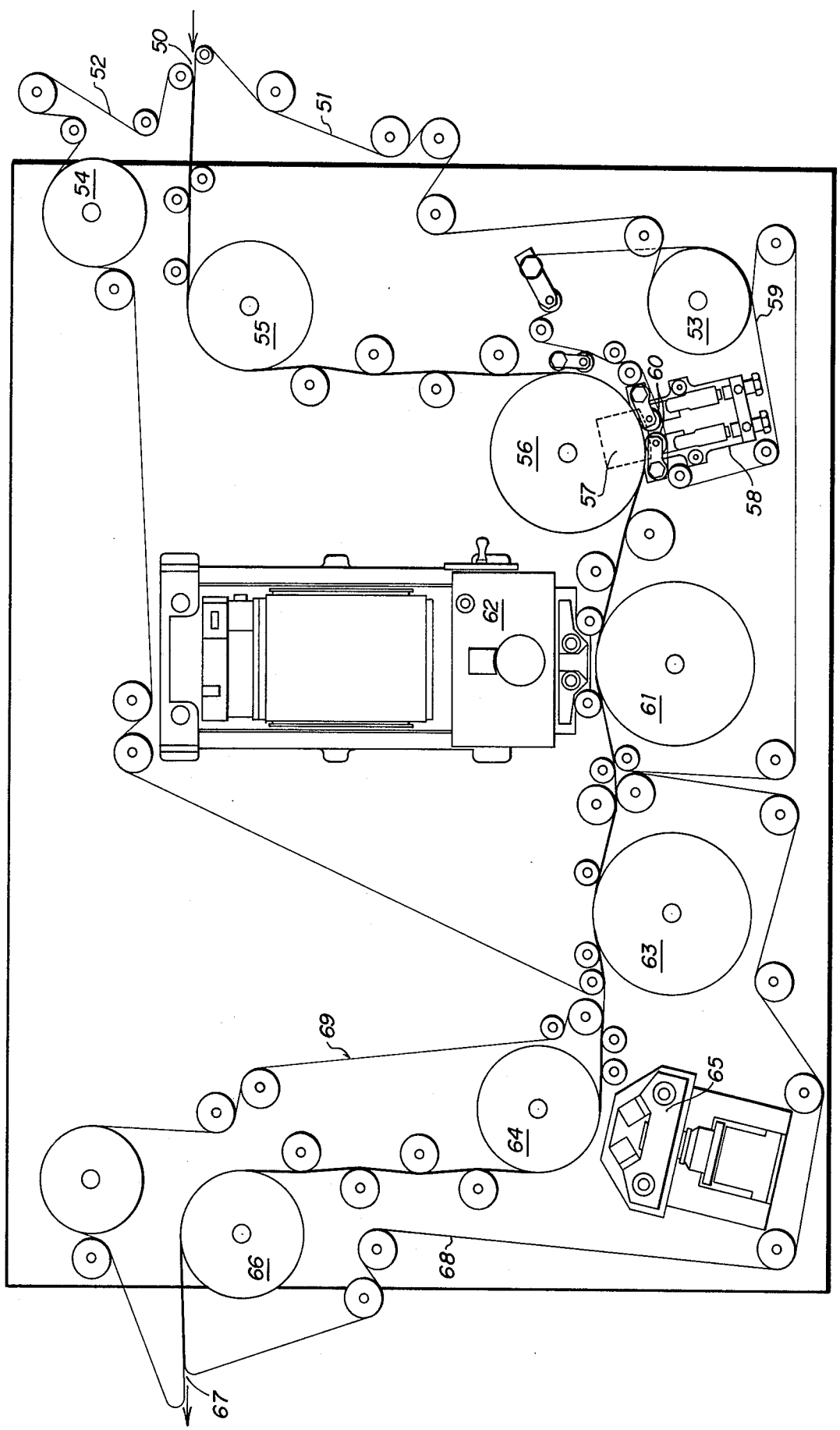
FIG. 3 is a plan view of the read module of FIGS. 1 and 2.

FIG. 3 illustrates the read module 22 of one embodiment of the present invention wherein documents from the feeder enter a document transport system at point 50. The documents are transported by and between a pair of high speed belts, a face belt 51 and a back belt 52. Face belt 51 is driven by a drive pulley 53. Back belt 52 is driven by a drive pulley 54. Belts 51 and 52 pass over an idler pulley 55 and along an arc defined by a portion of the surface of an MICR drum 56. The face of the document is in contact with the face of drum 56. A MICR read head 57, shown dotted, is mounted on an adjustable base 58 and serves to read the alphanumeric data encoded in magnetic ink on the bottom of each check passing through the system. A belt 59 which also is driven by pulley 53 is directed over a set of idlers 60 which control the document as it moves around the arc of drum 56 to be read by the MICR reader 57.

The documents then pass over an OCR read drum 61 at which location an optical character reader 62 optically reads the same bottom line of alphanumeric information on each document.

Documents then pass over an idler drum 63 and around an arc on a bar code read drum 64. An optical bar code reader 65 is positioned adjacent to the perimeter of drum 64 in order to selectively read bar code imprinted information on the back of documents passing over drum 64. From drum 64, the documents pass around an arc of an idler drum 66 where they are delivered from exit port 67 into a document transport system on the bar code/IJP module 23.

A back belt 68 begins drive of documents at a point between read drum 61 and idler drum 63. A face belt 69 begins drive of documents at a point between idler drum 63 and bar code read drum 64.

FIG. 4

Documents delivered to the module 23 pass an ink jet gun 70 which applies bar coded data to the back of checks passing gun 70. Documents then pass over a shallow arc on an idler drum 71 at which location a bar code validater 72 is located optically to verify the bar codes printed by gun 70. Documents then traverse a path past a second ink jet gun 73. Gun 73 is adapted to print alphanumeric characters on the back of documents. From gun 73, document then pass a third ink jet gun 74 which is adapted to print alphanumeric characters on the face of documents.

FIG. 5

Documents then are delivered by a face belt 75 and the back belt 76 to feature module 24. In feature module 24, documents move past a suitable set of mirrors so that as they pass location 77, the optical image of both the front and back of each document is recorded by a microfilm camera 78. Documents then move under the control of face belt 79 and back belt 80 into the document transport system of the stacker module 25.

The document feeder module 20 may include a feeder of the type described in U.S. Pat. No. 3,738,641 granted June 12, 1973. Since the above feeder as well as others as described in U.S. Pat. No. 3,300,207 and U.S. Pat. No. 3,421,753 are well known, the feeder will not be further detailed.

MICR reader unit 57 of FIG. 3 is of a well known type capable of reading magnetic ink characters.

The optical character recognition unit 62 may be of the type described and claimed in U.S. Pat. No. 3,703,628 granted Nov. 21, 1972. Improvements on that system are described and claimed in U.S. Pat. No. 3,717,848 granted Feb. 20, 1973 and in U.S. Pat. No. 3,761,876 granted Sept. 25, 1973. The disclosures of the above patents are therefore incorporated herein by reference, all relating to a system manufactured and sold by Recognition Equipment Incorporated of Dallas, Texas as Input 80.

The optical bar code reader 65 preferably will be of the type described and claimed in U.S. Pat. No. 3,780,270 granted Dec. 18, 1973 or as described in U.S. Pat. No. 3,703,628.

Ink jet guns 70, 73 and 74 preferably will be of the type described and claimed in U.S. Pat. No. 3,596,276 granted July 27, 1971 or as described in U.S. Pat. No. 3,703,628.

Figure 6:
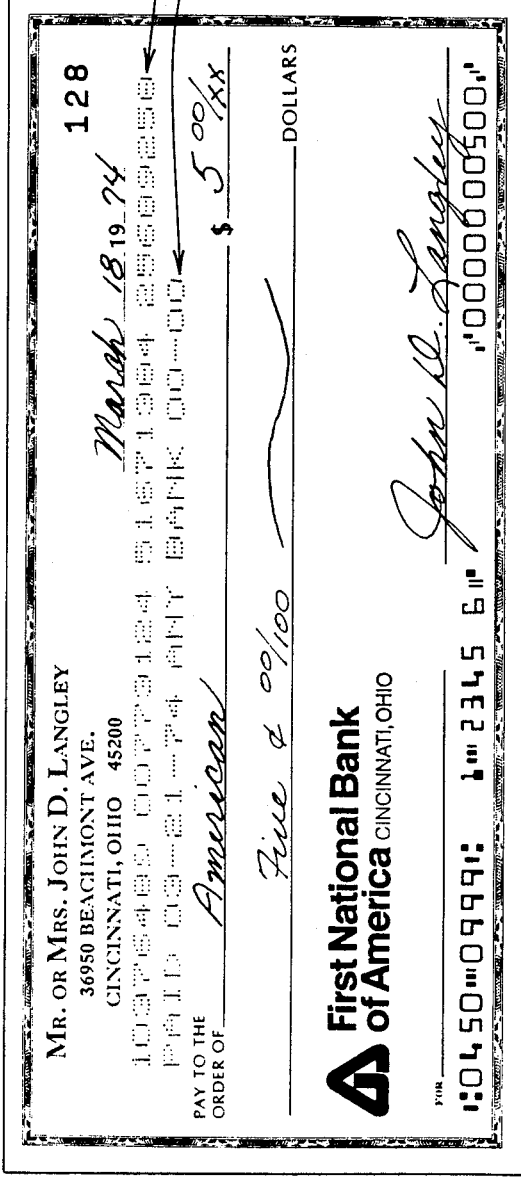
FIG. 6 illustrates the face of a fully processed and canceled personal check.
Figure 7:
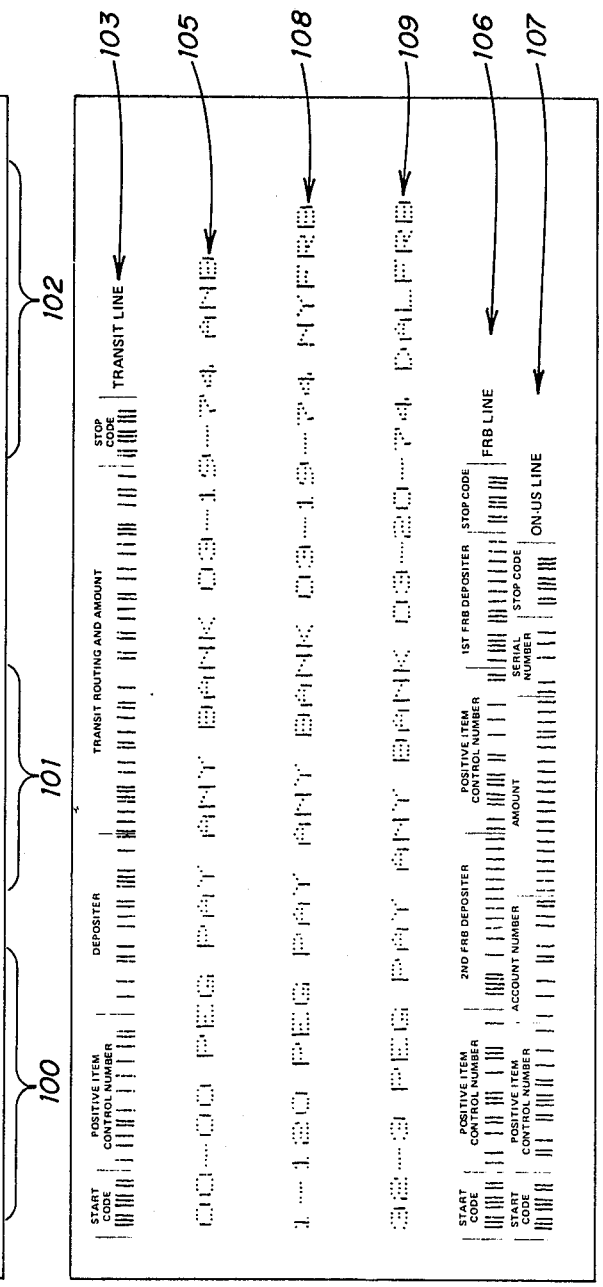
FIG. 7 illustrates the back of the same check.

FIGS. 6 and 7

The face of a fully encoded personal check processed in accordance with the present invention is illustrated in FIG. 6 and the back of the check is illustrated in FIG. 7.

The bottom line on the check, FIG. 6, comprises three data fields. The first field 100 is coded to represent the identity of the bank on which the check is drawn. The second field 101 is coded to represent the identity of the maker. Field 102 is a field in which the amount for which the check is drawn is encoded. The fields 100-102 are encoded in magnetic ink characters of a special font which has been generally adopted by the financial community for encoding and making possible the MICR operations in handling financial documents such as checks. The amount in the last field 102 is manually encoded when the check is received by the first banking institution in its flow for collection. Other fields may also be included on the same line and may be read and utilized for special purposes not necessary to the present invention.

In accordance with the present invention, an ink jet printer 70 is employed at the first bank to which the check is presented to record necessary transit information on the top line 103 on the back of the document. Line 103 includes bar encoded fields including a start code, a positive item control number (hereinafter called PICN), the depositer identification, a transit routing and amount and a stop code. Line 103 is coded by the first commercial or Federal Reserve Bank with a suitable system. The bank tests for the presence of bars in the transit routing field. If there are no bars and the bank testing is a commercial bank, they encode the entire top line with their unique PICN, their depositor, transit routing and item amount. If the one testing is a Federal Reserve Bank, they encode only transit routing and amount. At the same time, the alphanumeric printer 74 applies the PICN on line 104, FIG. 6, on the face of the document. The alphanumeric printer 73 is then employed to endorse the check on line 105 on the back indicating that "any bank" is to be paid. The document is then sorted based upon the transit routing code on line 103.

All checks in the first bank sorted and routed to a first Federal Reserve Bank bin would, upon receipt, be read by a reader corresponding to reader 65. The Federal Reserve Bank with a suitable system tests for the presence of bars in the first Federal Reserve Bank field of line 106. If there are none, they encode their unique PICN and their depositor. If bars are present in the first field, they encode the second Federal Reserve Bank field. The Federal Reserve Bank also tests the transit routing field on the first line 103. If there are no bars, they encode only the transit routing and amount in line 103.

In the present example there would be no data in such field. Thus, the first Federal Reserve Bank would apply on line 106 its code in the first FRB depositor field along with the PICN. The first Federal Reserve Bank would endorse the check on line 108 to the second Federal Reserve Bank. The second Federal Reserve Bank would endorse the check on line 109 to the on-us bank.

Checks are sorted by the second FRB for transmission to the banks on which the checks are drawn. The on-us bank tests the MICR encoded transit routing in field 100, FIG. 6, to determine if the item is drawn on them. They encode on line 107 their unique PICN and on-us data such as account number, amount (if not on top line), transaction code and serial number. The on-us bank would then cancel the check by printing the notation indicated on line 110, FIG. 6, on the face of the check.

In connection with each of the foregoing transactions, the encoded data is read into an accounting system in order that the necessary bookkeeping operations for each institution through which the document passes can be carried out under automated control and in accordance with established and well known principles.

In one embodiment of this system, the amount was encoded on each check utilizing a ten character field. A depositor's number was encoded as an account number of twelve characters for individual or bank numbers, the latter being used when the deposit is made at a Federal Reserve Bank. The PICN was provided with eight characters whereby each bank may provide its own unique PICN. This PICN is encoded on the back of each document in human readable form and encoded on the face of each document in human readable form. The PICN is also carried in the microfilm, image disk, tape and all printed reports involving the operation of the system. The PICN on line 106 also includes two digits to distinguish what bank in the chain encoded what information.

The "on-us" data in line 107, FIG. 7, was of thirty-two characters to encode the serial number, account number, transaction code and the amount if not previously encoded. The transit routing was as printed in MICR on the front of the document in field 100.

Thus, the invention provides a user with all the information to process transit or "on-us" checks. This format also provides a user with means of returning items through the same channels that they were received.

The following is given by way of example: Assume that all the banks in the chain have systems embodying the invention. A credit card company in Los Angeles receives a payment from a customer in Chicago. The credit card company deposits the check at their commercial bank in Los Angeles. The bank bar encodes the top line on the back of the check with a unique PICN, the account number of the depositor, the transit routing and amount from the MICR. The bank then sends the check to the Los Angeles Federal Reserve Bank. The Federal Reserve Bank encodes under "FIRST FRB" their unique PICN and the bank number of the bank that deposited the check with them. Sorting on the previously encoded transit routing, they determine the check is to be sent to the Chicago Federal Reserve. Control is maintained by reading and storing the previously encoded amount. The Chicago FRB then encodes their unique PICN in the PICN field and the Los Angeles FRB number in the depositor field under "2nd FRB."

By reading the amount for control and sorting on transit routing, the Chicago FRB determines what local bank the check is drawn on and forwards the item to that bank. The check is now an "on-us" item to a Chicago commercial bank. The bank encodes their unique PICN and "on-us" information on the bottom line. The on-us data will contain the account number and other information as determined by the bank at installation.

Each commercial bank with a system embodying the invention will first read the MICR field 100 to determine if the check is theirs. If it is not, they will encode their unique PICN on the check along with the transit routing and amount. If the check is drawn on the bank reading it, they then check to see if the amount has been encoded. If it has, they will encode the depositor on the on-us line 107. If the amount is not present, they will encode the amount on line 107. Each Federal Reserve Bank will check the first FRB field. If it is empty, they will encode there; if it is encoded, they will encode the second FRB field.

System components are preferably so marshalled that both commercial banks and Federal Reserve Banks will be able to encode and read the top line 103; Federal Reserve Banks will not be able to encode or read the bottom line 107; and commercial banks will not be able to encode or read the FRB line 106.

To illustrate the significance of use of PICN, consider the following example of return item processing.

Assume that the Chicago commercial bank mentioned above refused payment because of insufficient funds. Because each bank in the chain has been credited and debited for the amount of the check, the returned check must follow the same path on its return. The on-us bank sorts the item on their depositor number and determines it came from the Chicago Federal Reserve Bank and returns it to them. The Chicago FRB reads both FRB PICNs from line 106. The last two digits of the PICN is a unique number identifying to the Chicago FRB which FRB area they coded. Sorting the item, Chicago determines the check was deposited by the Los Angeles FRB, and returns it to them. Los Angeles repeats the same procedure as the Chicago FRB, determines what bank in their district deposited the item and returns it to the local commercial bank. The commercial bank reads the top line 103 to determine if the last two digits of the PICN uniquely identifies that they encoded the top line. The bank then sorts the item on their depositor and returns it to the credit card company.

As with transit items, control is maintained in return item processing by totaling on amount.

If not all banks in the chain have a system embodying the invention, each will read their specific line and the unique identifying number to determine which field they encoded and the identity of the party to whom the item is to be returned.

Items being returned will usually be sent through again by the original depositor. In such case, the document will have strips placed over the existing bar codes or it will be placed in a carrier envelope and follow the original routing.

FIG. 8

Figure 4:
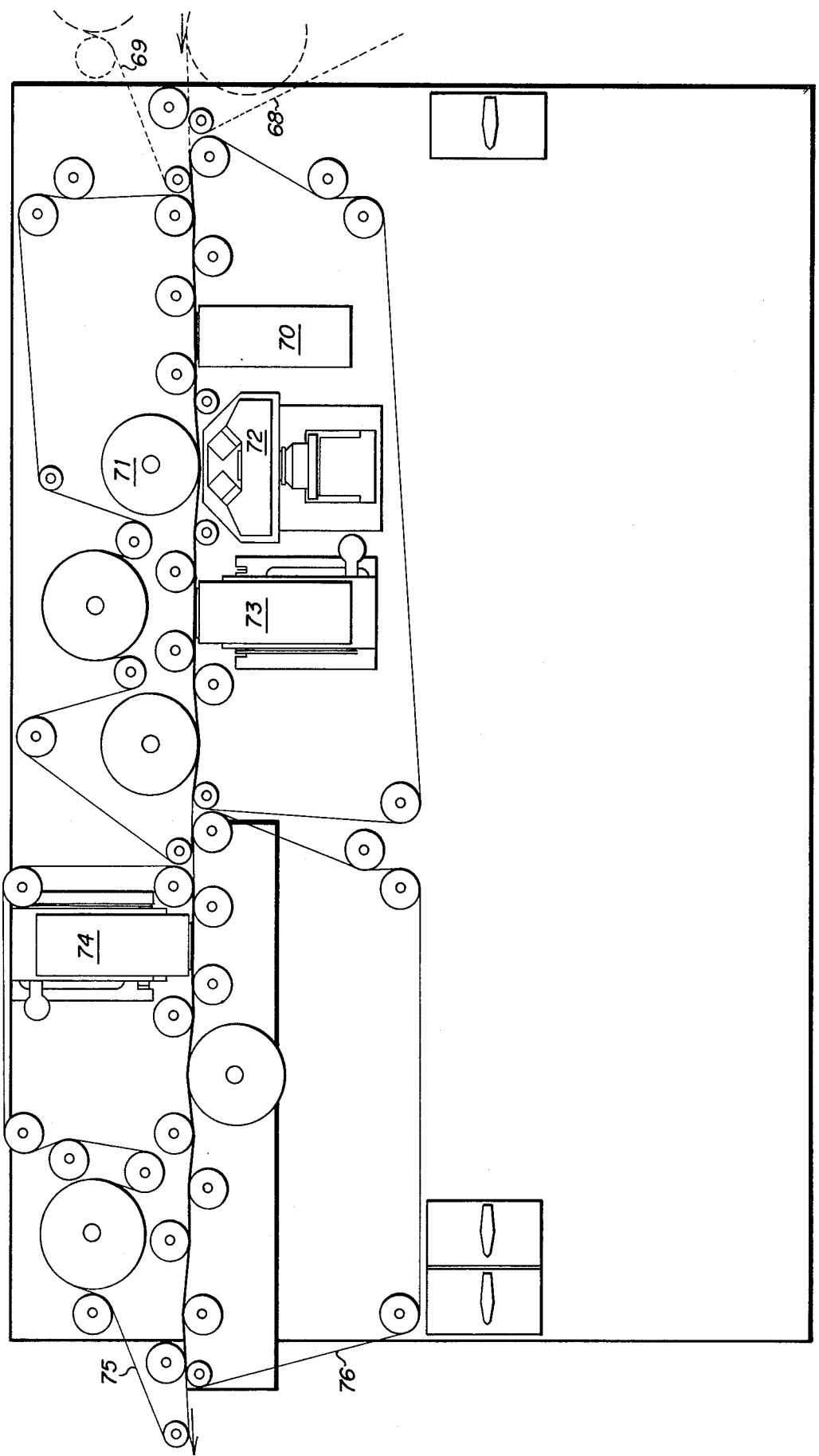
FIG. 4 is a plan view of the bar code/IJP module of FIGS. 1 and 2.
Figure 5:
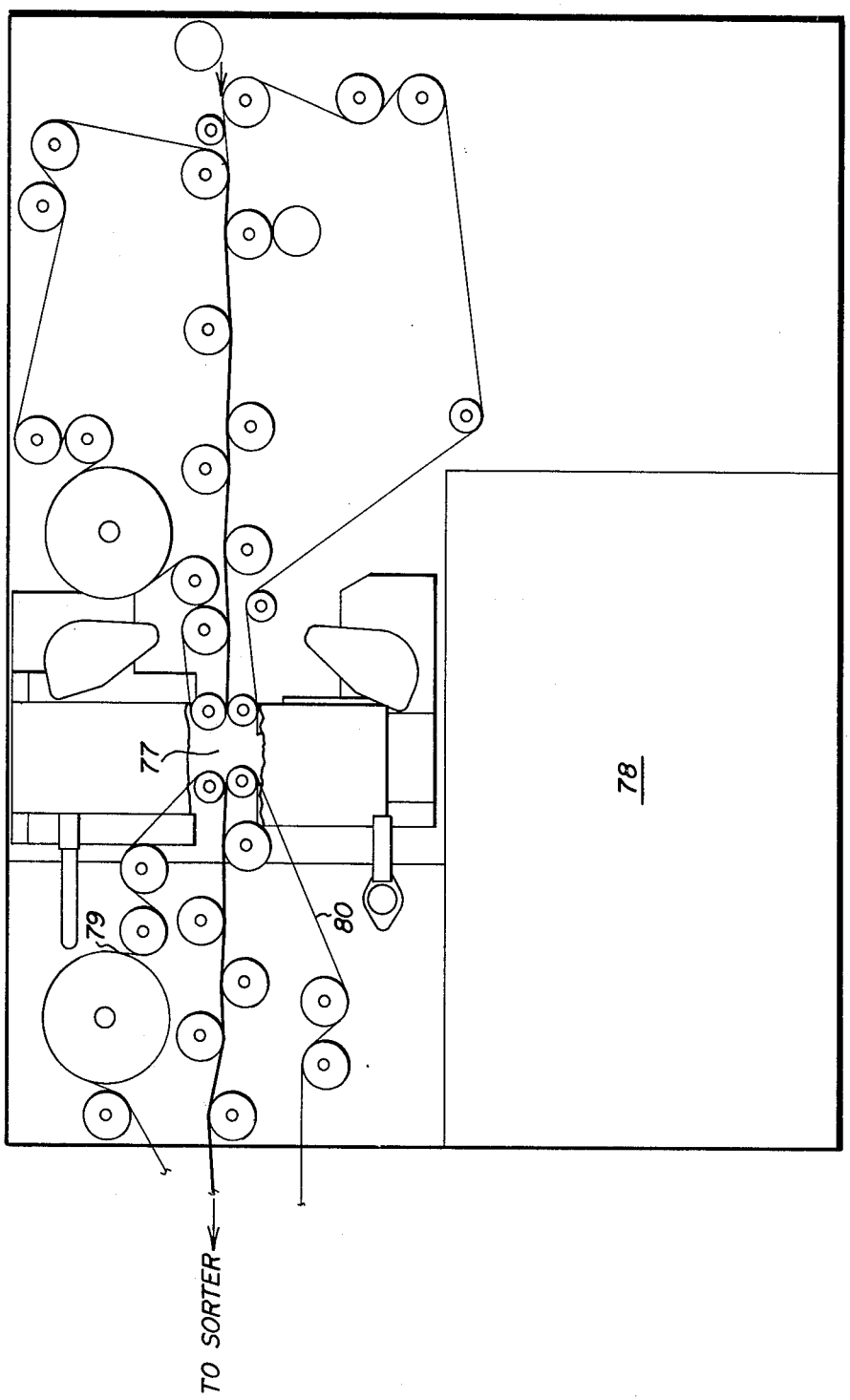
FIG. 5 is a plan view of the feature module of FIGS. 1 and 2.
Figure 8:
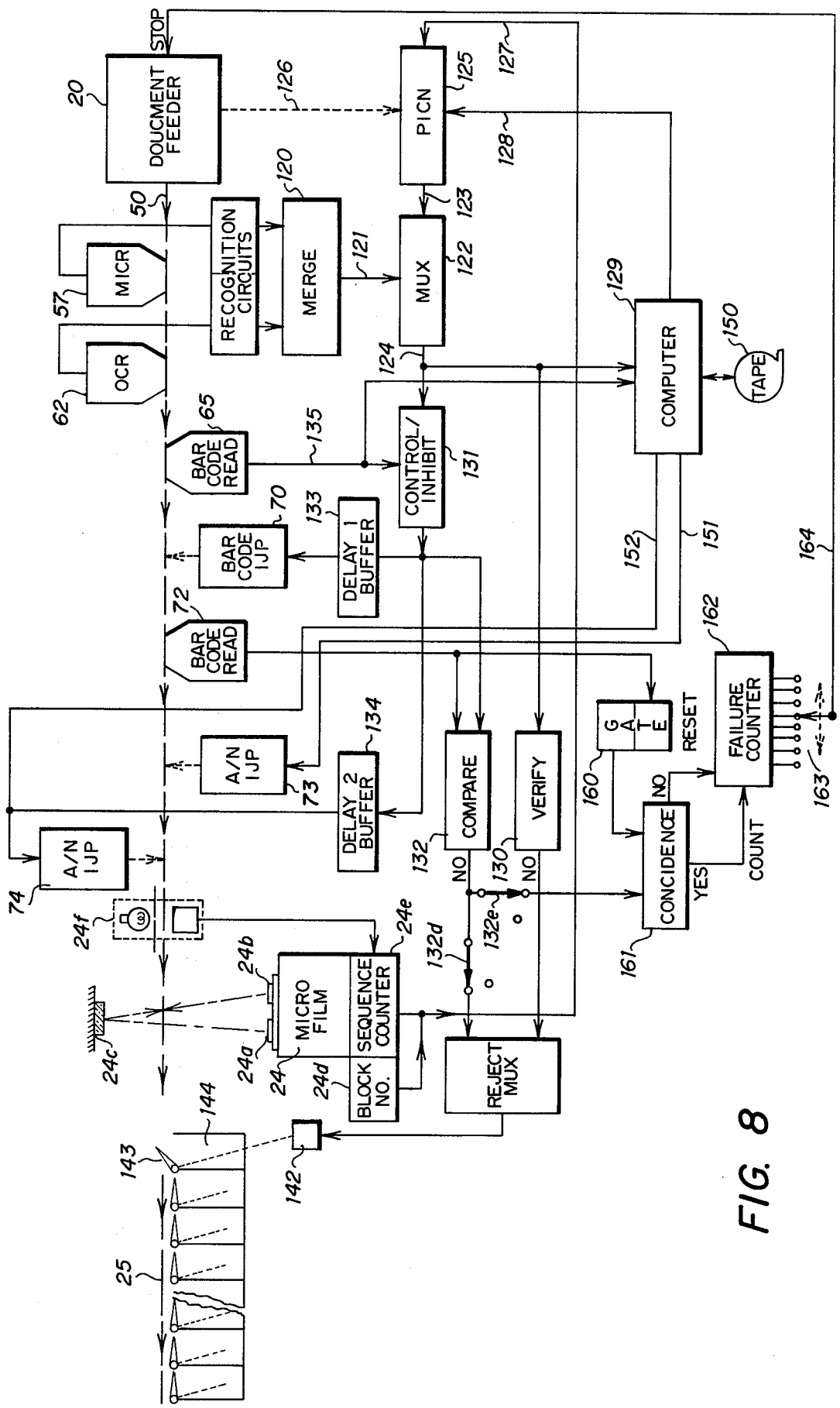
FIG. 8 is a block diagram showing the relation of control functions in carrying out the operations embodied in the present invention.

Referring now to FIG. 8, the document feeder 20 starts documents along their path beginning at point 50 so that, as in FIGS. 3, 4 and 5, the MICR read head 57, the OCR read head 62 and the alphanumeric ink jet gun 74 are associated with the face of the documents. The bar code reader 65, the bar code ink jet gun 70, the bar code reader-verifier 72, the alphanumeric ink jet gun 73 are associated with the back of the documents. The microfilm camera 24 is adapted to record both the face as through a lens system 24a and a mirror 24c and the back by lens system 24b.

Output signals from the MICR read head 57 and the OCR read head 62 are applied to a merge unit 120. In accordance with known techniques, the two inputs to merge unit 120 are employed to produce a single output data stream on a bus 121. Failure of MICR to identify each given character in fields 100-102 may thus be supplemented by use of the output from the OCR reader whereby the incidence of read failure is greatly reduced relative to systems which use either head 57 or an OCR reader 62 alone.

A channel 121 is connected to a multiplexer 122 in which the information on channel 121 and information on a channel 123 are combined to provide an output on channel 124 which includes the data on fields 100-102 combined with the PICN on channel 123. Channel 123 leads from a PICN generator 125. Generator 125 may be linked to the flow of documents from the feeder 20 as by way of a linkage 126. Preferably, however, the generation of PICN is correlated with the block number and the last four digits of the block sequence from counters 24d and 24e in the microfilm camera 24 as applied by a channel 127 from camera 124 to PICN generator 125. A sensor 24f is shown in relation to a sequence 24e to provide for generation of the PICN and to aid in operation of camera 24 and in use of the photographic record produced by camera 24. A channel 128 extends from a central computer 129 for synchronization purposes. Thus, the combination of the data from fields 100-102, FIG. 6, appears on the output channel 124 along with the PICN for the document from which such data is obtained.

Data on channel 124 is then applied to computer 129, to a verify unit 130 and to a control/inhibit unit 131. Unit 131 applies the same output to a comparison unit 132 and to delay buffers 133 and 134.

The output of the bar code reader 65 is applied by way of channel 135 to the control/inhibit unit 131 and to the computer 129. If the bar code reader 65 senses a bar code previously printed on line 103, FIG. 7, for example, it will inhibit bar code printers 70 and 74. If a document has not been previously encoded, then the data from the control/inhibit unit 131 will be applied by way of delay buffers 133 and 134 to the ink jet guns 70 and 74. Bar code reader 72 supplies a second input to the comparison unit 132. If the data from channel 124 is the same as that printed by the gun 70 and thereafter read from the document by reader 72, then the document may pass through to sorter 25. However, if on comparison the imprinting on the document does not correspond with the input to the gun 70, then the output of the compare unit 132 is applied to a reject multiplexer 140 by way of selector switch 132a. The output of multiplexer 140 appears on channel 141 and is applied to control unit 142 to actuate a gate 143 which diverts the improperly or incompletely coded document into a reject bin 144.

The output of bar code reader 72 is connected to a gate 160 whose output is connected to one input of a coincidence circuit 161. The output of compare unit 132 is connected by way of switch 132b to the second input of coincidence circuit 161. The true output of circuit 161 is connected to a failure counter 162. The false output of the coincidence circuit 161 is connected to the reset terminal of counter 162. The output of counter 162 may be selected by means of switch 163 to apply a stop control signal by way of line 164 to the document feeder. Gate 160 may be a monostable multivibrator that is gated on once upon appearance of each document at reader 72 and stays on for a period corresponding to the passage of the document past reader 72. It will be recalled that comparison unit 132 provides a true output when there is failure in the comparison between that which was applied to the printer 70 and that which is read by reader 72. The output of unit 132 may then be applied by way of switch 132b to the second input of coincidence unit 161.

Each time there is failure in the comparison unit 132, a pulse will be applied to counter 162, otherwise a reset pulse appears at the reset terminal of counter 162. By means of the switch 132b, gate 160, coincidence circuit 161, counter 162 and selector switch 163, the system can be shut down if a selected number of consecutive documents are not properly encoded by printer 70. In practice, the systems have been operated to shut down when five consecutive documents are not properly imprinted by printer 70.

The switch 132a also permits selection of the function of sorting to a reject bin 144 every document which fails to meet the test of comparison unit 132. Either or both of the functions provided by switches 132a and 132b may be employed. In some operations, it has been found to be more economical to sort and reenter documents not properly imprinted by the printer 72 at a stage later than the first pass in the system. When both switches 132a and 132b are conductive, rejects are sorted into bin 144 and the system will be shut down if more than the number allowed by the selected output appear in succession.

Data on channel 124 is applied to verify unit 130. This provides a check to make certain that all of the characters appearing in field 100-102 are successfully identified. If any character is not identified in a block where data is known to exist, then the reject multiplexer 140 is actuated to divert the document to the bin 144. It will be noted that in such case, codes for all characters properly identified on bus 124 are applied through buffers 133 and 134 to guns 70 and 74 partially to encode the document on its first pass through the system. Such partially coded documents then may be examined and correlated with the record applied to a tape unit 150 by computer 129 so that a complete encoding of the document may be ultimately completed on line 103, FIG. 7, and a record thereof provided on tape 150.

A channel 151 extends from computer 129 to provide for actuation of gun 73 when and if it is desired to endorse a train of checks as by imprinting on one of the lines 105, 108 or 109, FIG. 7. A channel 152 extends to gun 74 to provide for cancellation by printing as on line 110, FIG. 7.

From the foregoing it will be understood that the system illustrated in FIG. 8 may be used for first pass operations wherein the information is initially captured by bar code imprinting on line 103, FIG. 7, and the PICN is applied to the face of the document as on line 104, FIG. 6.

Control of the system will be understood generally to correspond to systems currently in use involving operations of the Input 80, above identified wherein alphanumeric information is captured by an optical reader and employed in accounting operations, and operations described in U.S. Pat. No. 3,703,628 wherein bar codes are printed on traveling documents and sorting operations subsequently are carried out based on the applied bar codes. Preferably the ink employed herein will be fluorescent so that bar codes applied over prior printed matter such as stamped or printed endorsements may be distinguished and read by readers 65 and 72.

Control of sorting and tracking documents preferably will be carried out in accordance with the known methods and systems. A suitable system is described and claimed in U.S. Pat. No. 3,815,102 entitled "Method and Apparatus For Item Tracking" (attorney's docket B-2539). In general, document tracking and sorting is well known and thus has not been further detailed herein. Another suitable method of document sorting is described in U.S. Pat. No. 3,460,673 entitled "Document Sorting Apparatus."

Discrete elements have been shown in the control system in FIG. 8. For example, the multiplexer 122, the control/inhibit unit 131, delay buffers 133 and 134, comparison units 132, verify unit 130, gate 160, coincidence unit 161 and counter 162 are shown. It will be appreciated that these units, as well as others, may be implemented through the use of software in connection with operation of computer 129. However, they have been separately shown in FIG. 8 in order that their functions may more readily be understood.

Having described the invention in connection with certain specific embodiments thereof, it is to be understood that further modifications may now suggest themselves to those skilled in the art and it is intended to cover such modifications as fall within the scope of the appended claims.

What is claimed is:

1. An automated processing system for bank checks encoded with magnetic alpha-numeric characters along a line on the face of each check, comprising;
    a. means for transporting said check serially as a constant velocity train through a processor to a sorter,
    b. at a first station in said processor means for generating an item control number unique to each said document and to the bank processing the document,
    c. at a second station in said processor means for sensing each character in said line to produce a string of data signals from each document,
    d. at a third station in said processor means for printing said control number on each said document in at least one of bar code form and human readable form, and
    e. means at a station intermediate said second and third stations scans the site at which each said document is to receive said bar code for the presence of bar codes and printing means at said third station is inhibited in response to detection of a bar code at said site.

2. Automated processing of bank checks encoded with magnetic alpha-numeric characters along a line on the face of each check comprising the steps of:
    a. transporting said checks serially as a constant velocity train through a processor to a sorter,
    b. generating in said processor an item control number unique to each said document and to the bank processing the document,
    c. at a first station along the path of said train in said processor sensing each character in said line to produce a string of data signals from each document, d. at a second station in said processor imprinting said control number and at least part of said data signals on each said document in at least one of bar code form and human readable form, and e. sensing the site at which each said document is to be imprinted in bar code form for the presence of bar codes at a station intermediate said first and second stations and wherein any imprinting at said second station is inhibited in response to detection of a bar code at said site.

3. In a document sorter-processor where a high speed transport moves a train of documents through an alphanumeric character reader means and a first ink jet printer to addresses in a family of destinations selected on the basis of data read from each said document by said reader means and wherein means connected between said reader means and said printer actuates said printer to imprint on each said document a coded representation of signals from said reader means, the combination comprising:

a. control means changing with passage of each said document in said train to produce an ordered set of indicia, one member thereof for each document, b. an alphanumeric ink jet printer through which said train passes positioned on the side of said train opposite said first printer, and c. means for delayed actuation of at least one of said first and second printers in response to said control means to apply one of said indicia as a positive item control number to each said document during passage through said one of said printers.

4. In a document sorter-processor where a high speed transport moves a train of documents through an alphanumeric character reader means and a first ink jet printer to addresses in a family of destinations selected on the basis of data read from each said document by said reader means and wherein means connected between said reader means and said printer actuates said printer to imprint on each said document a coded representation of signals from said reader means, the combination comprising:

a. control means changing with passage of each said document in said train to produce an ordered set of indicia, one member thereof for each document, b. a second ink jet printer through which said train passes, c. means for delayed actuation of at least one of said first and second printers in response to said control means to apply one of said indicia as a positive item control number to each said document during passage through said one of said printers, and d. a bar code reader located between said reader means and said first printer and aligned therewith to selectively disable said first printer to prevent overprinting a previously applied code representation on any of said documents.

5. In a document sorter-processor where a high speed transport moves a train of documents through an alphanumeric character reader means and a first ink jet printer to addresses in a family of destinations selected on the basis of data read from each said document by said reader means and wherein means connected between said reader means and said printer actuates said printer to imprint on each said document a coded representation of signals from said reader means, the combination comprising:

a. control means changing with passage of each said document in said train to produce an ordered set of indicia, one member thereof for each document, b. a second ink jet printer through which said train passes, c. means for delayed actuation of at least one of said first and second printers in response to said control means to apply one of said indicia as a positive item control number to each said document, d. a third ink jet printer positioned adjacent to the back of said train to apply alphanumeric data selectively to the back of said documents, and e. control means to enable printing of said alphanumeric data on the back of documents during passage through said one of said printers in response to a preset format uniquely identifying the processor of said documents.

6. In a document sorter-processor where a high speed transport moves a train of documents through an alphanumeric character reader means and a first ink jet printer to addresses in a family of destinations selected on the basis of data read from each said document by said reader means and wherein means connected between said reader means and said printer actuates said printer to imprint on each said document a coded representation of signals from said reader means, the combination comprising:

a. verifying means through which said train passes for sensing and comparing said coded representation applied to each said document by said printer with corresponding signals applied to said first printer, b. control means changing with passage of each document in said train to produce an ordered set of indicia, c. a second ink jet printer through which said train passes, d. means for delayed actuation of said first and second printers in response to said control means to apply one of said indicia as a positive item control number to said document in bar code form and alphanumeric form, e. means responsive to detection of predetermined incomplete code printing of said first printer to effect the stopping of said transport and delivering incomplete code printed documents to a reject destination, and f. counter means for counting the number of consecutive documents with incomplete code printing and provided with means for stopping said transport when said counter reaches a predetermined level.

7. The system of claim 6 in which means are provided to deliver to a reject destination any document sensed by said verifying means as incompletely imprinted.

8. In a document sorter-processor where a high speed transport moves a train of documents through an alphanumeric character reader means and a bar code ink jet printer positioned at the back of said train to addresses in a family of destinations selected on the basis of data read from said document by said reader means and wherein means connected between said reader means and said printer actuates said printer to imprint on each said document a coded representation of signals from said reader means, the combination comprising:

a. verifying means through which said train passes for sensing and comparing said coded representation applied to each document by said bar code printer with corresponding signals applied to said bar code printer, b. control means changing with passage of each document in said train to produce an ordered set of indicia, c. an alphanumeric ink jet printer through which train passes positioned on the face of said train, d. means for delayed actuation of said printer in response to said control means to apply one of said indicia as a positive item control number to said document in bar code form and alphanumeric form, and e. means responsive to detection of predetermined incomplete code printing of said bar code printer to effect a stopping of said transport and delivering incomplete code printed documents to a reject destination.

9. Automatic processing of bank checks encoded with magnetic alphanumeric characters along a line on the face of each check also having a transit routing field, comprising the steps of:

sensing the transit routing field for the presence of encoded data to produce a code presence signal, generating data signals including an item control number, one unique to each bank check processed, controlling an ink jet printer in response to the code presence signal to imprint in the transit routing field when the presence signal indicates an absence of encoded data the data signals including the bank check item control number, and sorting the bank check in response to the data imprinted in the transit routing field.

10. Automatic processing of bank checks as set forth in claim 9 wherein the item control number includes data identifying the processing bank.

11. Automatic processing of bank checks as set forth in claim 9 wherein the generated data signals include depositor identification data, transit routing data, and item amount data.

12. Automatic processing of bank checks as set forth in claim 9 including the step of recording the data signals in a memory storage.

13. Automatic processing of bank checks as set forth in claim 9 including the steps of:

sensing a bank field of each check for the presence of encoded data to produce a second code presence signal, generating second data signals including an item control number, one unique to each bank check processed, and controlling an ink jet printer in response to the second code presence signal to imprint in the first bank field when the second code presence signal indicates an absence of encoded data the second data signals including the bank check item control number.

14. Automatic processing of bank checks as set forth in claim 13 including the steps of:

sensing a second bank field for the presence of encoded data to produce a third code presence signal, generating third data signals including an item control number, one unique to each bank check processed, and controlling an ink jet printer in response to the third code presence signal to imprint in the second bank field when the third code presence signal indicates an absence of encoded data the third data signals including the bank check item control number.

15. Automatic processing of bank checks encoded with magnetic alphanumeric characters along a line on the face of each check also having a first bank field, comprising the steps of:

sensing the first bank field for the presence of encoded data to produce a first code presence signal, generating data signals including an item control number, one unique to each bank check processed, controlling an ink jet printer in response to the code presence signal to imprint in the first bank field when the first code signal indicates an absence of encoded data the data signals including the bank check item control number, sensing a transit routing field on each check for the presence of encoded data to produce a second code presence signal, generating data signals including transit routing information, controlling an ink jet printer in response to the second code presence signal to imprint in the transit routing field when the second code signal indicates an absence of encoded data the data signal including the transit routing information, and sorting the bank check in response to the data imprinted in the first bank field and the transit routing field.

16. Automatic processing of bank checks as set forth in claim 15 wherein the item control number includes digits to identify the processing bank.

17. Automatic processing of bank checks as set forth in claim 15 including the steps of:

in response to the presence of coded data in the first banking field, sensing a second banking field for the presence of encoded data to produce a third code presence signal, generating data signals including an item control number, one unique to each bank check processed, and controlling an ink jet printer in response to the third code presence signal to imprint in the second banking field when the third code signal indicates an absence of encoded data the data signals including the bank check item control number.

18. Automatic processing of bank checks as set forth in claim 17 including the steps of:

sensing the encoded transit routing field for a check drawn on the processing bank, generating data signals including an item control number, one unique to each bank check processed, and transaction data, and actuating an ink jet printer to imprint on a data field the data signals including the bank check item control number.

19. Automatic processing of bank checks encoded with magnetic alphanumeric characters along a line on the face of each check also having a transit routing field and first and second bank fields; comprising the steps of:

sensing the first banking field for the presence of encoded data to produce a first code presence signal, in response to a first code presence signal indicating data in the first banking field, sensing the second banking field for the presence of encoded data to produce a second code presence signal, generating data signals including an item control number, one unique to each bank check processed and the bank processing the check, controlling an ink jet printer in response to the second code presence signal to imprint in the second banking field when the second code signal indicates an absence of encoded data the data signals including the bank check item control number, and sorting the bank check in response to the data imprinted in the second banking field.

20. Automatic processing of bank checks as set forth in claim 19 including the steps of:

sensing the transit routing field for the presence of encoded data to produce a third code presence signal, generating data signals including an item control number, one unique to each bank check processed, and controlling an ink jet printer in response to the third code presence signal to imprint in the transit routing field when the third code presence signal indicates an absence of encoded data the data signals including the bank check item control number.

* * * * *